Sept. 24, 1940.   R S. WHITTINGTON   2,215,679
AUTOMATIC CONTROL OF CLUTCH AND THROTTLE
ACTUATION OF AN AUTOMOTIVE VEHICLE
Original Filed July 15, 1932
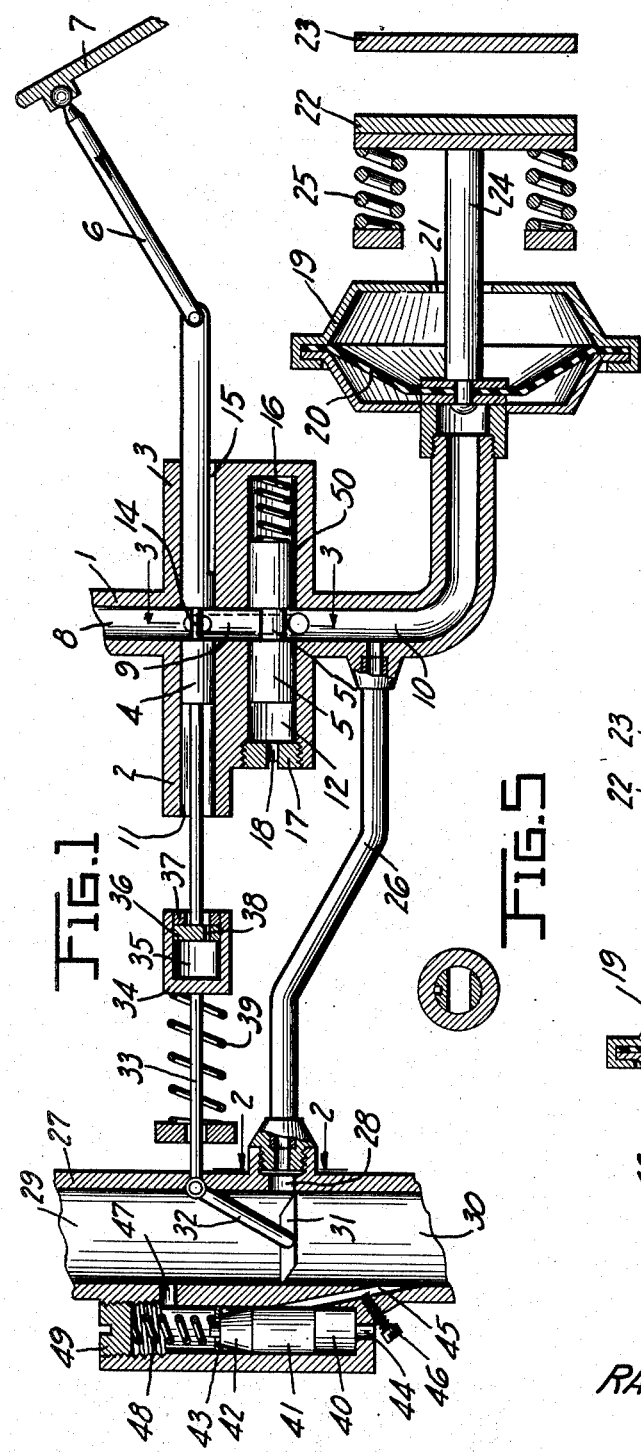
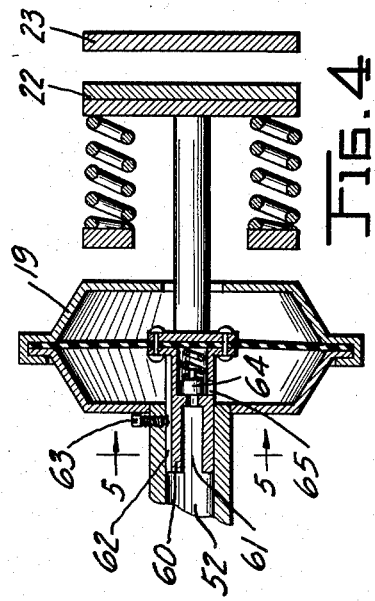
INVENTOR
RALPH S. WHITTINGTON
BY
ATTORNEY Patented Sept. 24, 1940

2,215,679

UNITED STATES PATENT OFFICE 2,215,679

AUTOMATIC CONTROL OF CLUTCH AND THROTTLE ACTUATION OF AN AUTOMOTIVE VEHICLE

Ralph S. Whittington, Springfield, Mass., assignor to Bendix Products Corporation, South Bend, Ind., a corporation of Indiana Original application July 15, 1932, Serial No. 622,703. Divided and this application November 1, 1937, Serial No. 172,172

6 Claims. (Cl. 192—.01)

This invention relates to an automatic control means for use in controlling the actuation of throttle and clutch of an automotive vehicle in their proper relation.

One of the primary objects of this invention is to provide a control means of the above-mentioned character which will effect a slower contacting of the clutch plates after the vehicle has been free wheeling or coasting for a time, than is obtained when the gears of the transmission are being normally shifted and the accelerator depressed to drive the vehicle.

Other objects of the invention and desirable details of construction and combinations of parts will become apparent from the following description of a preferred embodiment, which description is taken in conjunction with the accompanying drawing, in which:

Figure 1 is a semi-diagrammatic view partly in section of a control means constructed in accordance with this invention;

Figure 2 is a fragmentary cross-sectional view taken substantially on the line 2—2 of Figure 1;

Figure 3 is a fragmentary cross-sectional view taken substantially on the line 3—3 of Figure 1;

Figure 4 is a semi-diagrammatic view partly in section of the actuating diaphragm, as shown in Figure 1, with a control valve for this diaphragm, this mechanism constituting the essence of my invention; and Figure 5 is a fragmentary sectional view taken substantially on the line 5—5 of Figure 4.

In general, this invention provides an automatic control means for the clutch of an automotive vehicle which also accelerates the motor automatically at the instant that the clutch begins to engage. In prior devices of this nature this has been accomplished by means of mechanical connection to the accelerator pedal of such kind that the carburetor throttle valve would be opened the proper amount at the time the clutch started engagement. However, this has been a delicate adjustment and one that required frequent adjustment to secure the proper relation of the throttle valve setting and the beginning of clutch plate contact.

This invention further provides a means of securing the proper clutch plate contact after the vehicle has been free wheeling, or coasting, with the clutch disengaged, and the motor is accelerated to drive the vehicle again. The conditions encountered at this time are entirely different from those encountered while shifting the gears of the transmission and accelerating the motor to drive the car again, for at this time the motor is still revolving at several hundred revolutions per minute, and after the gears have been shifted and the accelerator depressed again, the motor will pick up speed very rapidly. But after the car has been coasting for a time, the motor has had time to slow down to a low speed and is idling. Then when the accelerator is depressed again to drive the car, the motor speed must necessarily require more time to come up to the speed of the car than in the former case where the motor is already turning rapidly. The result is that after free wheeling, the clutch will engage before the motor comes up to the speed of the car, and a jerk is felt as the motor is brought up to speed. This invention provides means of delaying clutch engagement until the motor comes up to speed, after the car has been free wheeling, without slowing up the clutch engagement during the shifting of the gears.

This invention also provides a method of contacting the clutch plates under full control of the accelerator pedal position, giving the operator of the vehicle better control while maneuvering the car in close quarters.

Referring then to the drawing wherein like reference characters designate corresponding parts through all views, there is shown in Figure 1 a system composed of a conduit 1 adapted to be connected by conduit to the intake manifold of the motor of an automotive vehicle. Conduit 1 is provided with lateral extensions 2 and 3, which slidably receive piston 4 and valve 5. Piston 4 is connected by linkage 6 to accelerator pedal 7. The conduit 1 is divided into passages 8, 9, and 10 by piston 4 and valve 5. Piston 4 operates in bore 11 to control the communication of passages 8 and 9. Valve 5 operates in bore 12 to control communication between passages 9 and 10. Passage 13 is provided to place passage 8 in communication with passage 10 only at such times that the reduced portion 14 of piston 4 is in alignment with passage 8, as shown in Figure 1, which corresponds to the position of complete release of the accelerator. Piston 4 is also provided with groove 15 adapted to place passage 9 in communication with the atmosphere upon a predetermined movement of piston 4. Valve 5 is actuated by spring 16 and is held in bore 12 by plug 17. Hole 18 opens bore 12 to the atmosphere. Conduit 1 terminates in diaphragm casing 19, placing one side of diaphragm 20 in communication with passage 10. Diaphragm 20 is exposed on its other face to atmospheric pressure through port 21 and is connected to the clutch plate 22 by stem 24. Clutch plate 22 is moved to contact clutch plate 23 by clutch springs 25. Tapped into the passage 10 is the conduit 26, which at its other end is tapped into the carburetor riser 27 at the rectangular port 28. Carburetor riser 27 is divided into pasage 29 and passage 30 by carburetor throttle valve 31. Passage 29 is adapted to be connected to the intake manifold of the motor of the vehicle, and passage 30 is adapted to be connected to th ecarburetor. Carburetor throttle valve 31 is actuated by arm 32 which is linked to the accelerator by rod 33 and piston 4. Rod 33 is provided with the enlarged portion 34 which contains the bore 35 in which the piston 36 is slidably mounted. Piston 36 is formed from an extension of piston 4 and is held in bore 35 by ring 37 pressed into bore 35. Piston 36 is provided with the small hole 38 to open bore 35 to atmosphere. Spring 39 is provided to actuate the throttle valve in opposition to the accelerator pedal. Carburetor riser 27 also contains the bore 40, which slidably receives piston 41 provided with taper 42 which is contacted by ring 43 pressed into bore 40 to form a stop for piston 41. Port 44 exposes piston 41 to atmospheric pressure. Passage 45 containing the adjustable restriction 46 places passage 30 in communication with bore 40 and port 47 communicates between bore 40 and passage 29. Spring 48 actuated piston 41 and plug 49 closes bore 40.

In the operation of the system, passage 8 is subject to the vacuum in the intake manifold and all parts are shown in Figure 1 in the position they occupy while the motor idles. Vacuum from passage 8 first acts through passage 13, groove 50 of valve 5 allowing atmospheric pressure acting through hole 18 to overcome spring 16 and place valve 5 in the position shown in Figure 1. Then by virtue of the reduced portion 51 of valve 5, diaphragm 20 is placed in direct communication with passage 8, allowing atmospheric pressure acting through port 21 on diaphragm 20 to overcome clutch springs 25 and move the clutch plates to the position shown in Figure 1. The gears of the transmission may now be shifted. When the accelerator pedal 7 is depressed, piston 4 is moved in the direction of the arrow to cut off vacuum in passage 8 from passage 9 and passage 13, and at approximately the same time place passage 8 in communication with the atmosphere through groove 15 in piston 4. As air is admitted to passage 9, it passes valve 5 by virtue of the reduced portion 51 and enters diaphragm casing 19 to begin to equalize atmospheric pressure acting on diaphragm 20, but by virtue of clutch springs 25 pulling on diaphragm 20 a vacuum sufficient to overcome spring 16 acting to close valve 5 is developed in passage 10 as the clutch plates move toward engagement.

As soon, however, as the clutch plates begin to contact, the pull of the clutch springs on diaphragm 20 will decrease, causing a drop in vacuum in passage 10. This drop in vacuum will be communicated to the exposed area of valve 5, and spring 16 is of such strength that valve 5 is moved to close passage 9 from passage 10 at some predetermined clutch plate pressure, and further engagement of the clutch must be effected by atmosphere entering passage 10 through port 28 and conduit 26.

The operation described above takes place when the accelerator pedal 7 is depressed just enough to move piston 4 to shut off vacuum in passage 8, and open passage 9 to the atmosphere through groove 15 in piston 4. While the accelerator pedal is in this position, the throttle valve 31 has moved only slightly and port 28 is still exposed largely to vacuum in passage 29. Hence vacuum will still exist in conduit 26. This vacuum will be transferred to conduit 10 and the clutch actuating member 20. However, regardless of the degree of vacuum at port 28, the vacuum at passage 10 cannot, while piston 4 opens passage 9 to atmosphere, exceed the vacuum at which valve 5 will allow atmospheric pressure acting through hole 18 to overcome spring 16, and thus admit more atmosphere from passage 9. Thus valve 5 at this stage acts as a vacuum regulating valve and insures that the clutch will remain partially engaged as long as atmospheric pressure exists in passage 9.

Passage 10 communicates with the carburetor riser through conduit 26 and port 28 which is rectangular in shape but narrow enough to have the proper restriction of its capacity. Port 28 is arranged so that all of its area is exposed to vacuum in passage 29, when the accelerator pedal 7 is completely released and the throttle valve is in the position shown in Figure 1. However, as the throttle valve is opened, more of the area of port 28 is exposed to near atmospheric pressure in passage 30. The result is that as valve 31 is opened its edge passes over the face of port 28, producing a continuous drop in vacuum in the conduit 26, and this action results in atmosphere being admitted to passage 10 and diaphragm 20 from passage 30 as the above action takes place. Thus the pressure in passage 10 depends on the proportionate amount of the area of port 28 that is exposed to the vacuum in passage 29 and near atmospheric pressure in passage 30, and the vacuum acting on diaphragm 20, and consequently the clutch plate pressure, can be increased or decreased accordingly as valve 31 is opened or closed. Complete clutch engagement will be obtained when port 28 is completely exposed to near atmospheric pressure in passage 30.

When the accelerator pedal 7 is depressed slowly, as when starting the vehicle, air passes through hole 38 from bore 35 fast enough to prevent the compression of spring 39 and the motion of valve 31 until piston 36 reaches the bottom of bore 35. At approximately the same time, piston 4 begins admitting atmosphere to diaphragm 20. The result is that the motor begins to accelerate as the clutch begins to engage. But when the accelerator pedal 7 is depressed rapidly, as after free wheeling, air is compressed in bore 35 due to the limited capacity of hole 38, and spring 39 is compressed resulting in the opening of valve 31 more in advance of clutch engagement. Obviously, the clearance of piston 36 in bore 35 could be made of the proper value to accomplish the same result.

During the normal idling of the motor, the vacuum in passage 29 acting through port 47 on piston 41 overcomes spring 48 and holds piston 41 against stop 43, as shown in Figure 1, due to atmospheric pressure acting through port 44. But at the instant that the clutch plates begin to contact, there is a drop in vacuum in the intake system of the motor and in passage 29. The drop in vacuum referred to occurs as the clutch begins to engage because at this time the motor begins to develop torque. As the motor is loaded more, the vacuum in the intake system will decrease, and can be made to decrease to a negligible quantity, as when the throttle valve is open wide at low motor speeds. This drop in vacuum begins to equalize atmospheric pressure on piston 41, and allows spring 48 to move piston 41 to uncover passage 45 and admit mixture from passage 30, through passage 45 to bore 40, and through port 47 to the intake system of the motor. Piston 41 is provided with taper 42 so that the greater the drop in vacuum in the intake system during the contacting of the clutch plates, the greater the rate at which mixture is admitted to the intake system to accelerate the motor. Thus a means of accelerating the motor automatically as the clutch begins to engage is provided, and the amount that the motor is accelerated increases as the speed of clutch engagement increases, since the vacuum will drop more in the intake system during the contacting of the clutch plates, the greater the rate at which mixture is admitted to the intake system to accelerate the motor. Thus a means of accelerating the motor automatically as the clutch begins to engage is provided, and the amount that the motor is accelerated increases as the speed of clutch engagement increases, since the vacuum will drop more in the intake system of the motor when the clutch is engaged more rapidly.

In Figure 4 is illustrated a diaphragm controlled clutch with a special valve for the diaphragm to be used in a control system of the nature illustrated in Figure 1. Vacuum in passage 52 acts through slot 61 of valve 60 as long as slot 61 is in register with the interior of diaphragm casing 19. However, as soon as slot 61 completely enters passage 52, air can be removed from the interior of diaphragm casing 19 to effect further motion of clutch plate 22 only through groove 62 of valve 60. Thus vacuum in passage 52 can act to rapidly disengage clutch plates 22 and 23, but after they have been disengaged some distance, their further motion apart is made much slower by the closing of the passage through the slot 61. Adjustable restriction 63 in groove 62 makes possible an adjustment of the speed at which the clutch plates continue to move apart after slot 61 completely enters passage 52. When vacuum is released in passage 52 and atmosphere is allowed to enter it to effect an engagement of the clutch, one-way check valve 64 opens due to the fact that pressure in passage 52 is greater than in the diaphragm casing 19 and provides an additional path for air to flow from passage 52 to casing 19 to effect a clutch engagement. Port 65 is provided to govern the capacity of this path. Thus, after slot 62 has completely entered passage 52, a path of two capacities is provided between passage 52 and the interior of diaphragm casing 19, the path having a greater capacity when motion of air is toward diaphragm casing 19, but being controllable in capacity in both directions. The result is that while the gears of the transmission are being normally shifted, the clutch will be disengaged only approximately to the point where all of slot 62 enters passage 52, because the interval of time that the accelerator is released is small, and consequently vacuum will not be present in passage 52 for any length of time. This is desirable since a quick engagement of the clutch is desired at this time, because the motor is turning fast when the accelerator is depressed and it will come up to speed comparatively fast. But when the car has been free wheeling for a time and the motor speed has reduced to idling, vacuum has been present in passage 52 for some time, and the action of this vacuum through groove 62 will have moved the clutch plates to the maximum distance apart. Then when the motor is accelerated to drive the car again, the contacting of the clutch plates will be delayed the proper amount by the combined capacity of the path through groove 62 and one-way check valve 64, which path must be the proper capacity to delay the contacting of the clutch plates until the motor, which has been idling and will come up to speed slower, has had time to come up to the proper speed. Thus a means is provided that takes care of the different conditions existing while shifting the gears of the transmission and while starting to drive the car again after it has been free wheeling or coasting.

The object in retarding the motion of the clutch plate 22 toward released position during the latter part of this motion, is to provide a means of delaying the next engagement of the clutch in proportion to the time that the motor has been idling. This is desirable, since the longer the motor has been idling the slower it will be running, and hence the longer it will take to come up to speed again when the accelerator is depressed again. Due to the check valve 64 and the port 65, the clutch engagement will always be delayed in proportion to the amount of air that must pass through port 52 to effect a clutch engagement, and this quantity of air will increase as the position of the clutch plate 22 changes to the left in Figure 4, this position being considered as the starting point for clutch engagement as the accelerator pedal is depressed to start a clutch engagement.

The invention heretofore described is disclosed in my Patent No. 2,103,284, granted December 28, 1937, this application constituting a division thereof.

While one illustrative embodiment has been described, it is not my intention to limit the scope of the invention to that particular embodiment, or otherwise than by the terms of the appended claims.

I claim:

1. In an automatic control means for the clutch of an automotive vehicle, the combination with the intake system and a mechanism for controlling the acceleration of the motor, of a member responsive to vacuum in said intake system for releasing the clutch, means providing a passage between said intake system and said pressure responsive member, means to open said passage whereby vacuum from said intake system actuates said pressure responsive member to release said clutch, means operating upon the actuation of said mechanism to reduce the vacuum acting on said pressure responsive member whereby said clutch is moved toward engaged position, means operating after said clutch has been released to slow up further motion toward release of said clutch.

2. In an automatic control for the clutch of an automotive vehicle, the combination with the intake system and a mechanism for controlling the acceleration of the motor, of a pressure responsive means for releasing the clutch, means providing a passage between said intake system and said pressure responsive means, means operating, when the aforementioned mechanism is released, to open said passage whereby vacuum from said intake system actuates the pressure responsive means to release the clutch, means operating upon the actuation of said mechanism to reduce the vacuum acting on said pressure responsive means whereby said clutch is moved toward engaged position, means operating after said clutch has been released to slow up further motion toward release of said clutch, means operating after the actuation of said acceleration control mechanism causes a reduction of vacuum acting on said pressure responsive means, to slow up the motion of said clutch toward engagement.

3. In an automatic control for the clutch of an automotive vehicle, the combination with the intake system and a mechanism for controlling the acceleration of the motor, of a pressure responsive means for releasing the clutch, means providing a passage between said intake system and said pressure responsive means, means operating when the motor is idling to open said passage whereby vacuum from said intake system actuates said pressure responsive means to release the clutch, means operating upon the actuation of said acceleration control mechanism to reduce the vacuum acting on said pressure responsive means whereby said clutch is moved toward engaged position, means operating after said clutch has been released to slow up further motion of said clutch toward release, means operating, after the actuating of said acceleration control mechanism causes a reduction of vacuum acting on said pressure responsive means, to slow up the motion toward engagement of said clutch through a portion of its motion toward engagement.

4. In an automatic control means for the clutch of an automotive vehicle, the combination with the intake system and a mechanism for controlling the acceleration of the motor, of a pressure responsive means for releasing the clutch, means providing a passage between said intake system and said pressure responsive means, means operating, when the aforementioned mechanism is released, to open said passage whereby vacuum from said intake system actuates said pressure responsive means to release said clutch, means operating upon the actuation of said mechanism to reduce the vacuum acting on said pressure responsive means whereby said clutch is moved toward engaged position, and a valve actuated upon the motion of said clutch, said valve affecting the capacity of communication between said intake system and said pressure responsive means.

5. In an automatic control means for the clutch of an automotive vehicle, the combination with the intake system and a mechanism for controlling the acceleration of the motor, of a pressure responsive means for releasing the clutch, means providing a passage between the intake system and said pressure responsive means, means operating to open said passage whereby vacuum from said intake system actuates said pressure responsive means to release said clutch, means operating upon the actuation of said mechanism to reduce the vacuum acting upon said pressure responsive means whereby said clutch is moved toward engaged position, and a valve actuated upon the motion of said clutch, said valve decreasing the capacity of said passage from said intake system to said pressure responsive means after said clutch has moved a certain distance toward released position, said valve also providing an additional passage in one direction only, between said passage and said pressure responsive means, said additional passage acting to permit the motion of said clutch toward engagement during the period that said valve affects communication between said passage and said pressure responsive means.

6. In an automatic control means for the clutch of an automotive vehicle, the combination with the intake system and a mechanism for controlling the acceleration of the motor, of a pressure responsive means for releasing the clutch, means providing a passage between said intake system and said pressure responsive means, means operating when the motor is idling to open said passage whereby vacuum from said intake system actuates said pressure responsive means to release said clutch, means operating on the actuation of said acceleration control mechanism to reduce vacuum acting on said pressure responsive means whereby said clutch is moved toward engaged position, and a valve actuated upon the motion of said clutch, said valve reducing the capacity of communication between said passage and said pressure responsive means after said clutch has moved to disengage, means providing a one way check valve permitting flow of atmosphere from said passage to said pressure responsive means when pressure in said passage is greater than in said pressure responsive means.

RALPH S. WHITTINGTON.